Feb. 7, 1956
C. H. BAKER, JR
2,733,732
VALVE CONTROL MECHANISM
Filed March 29, 1951
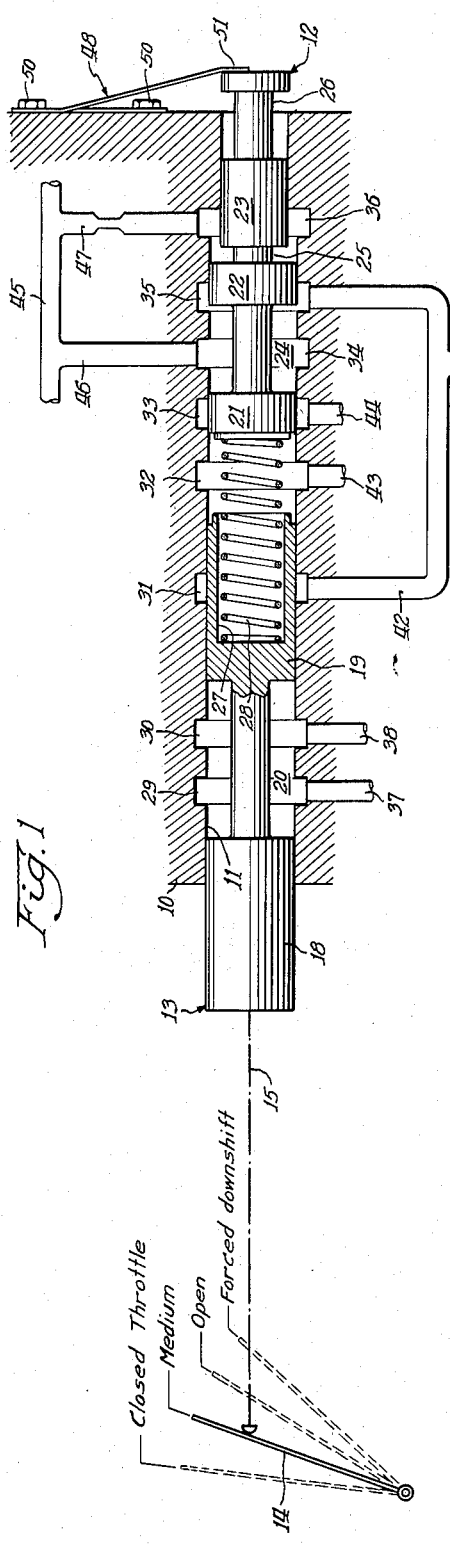
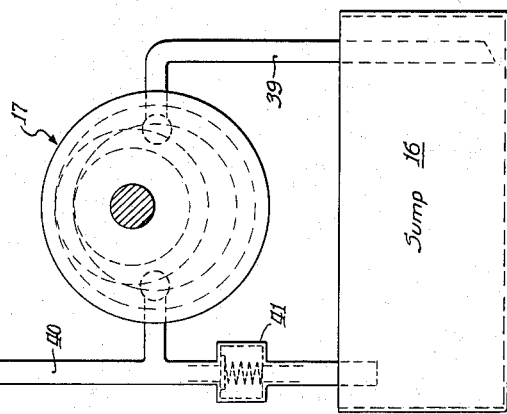
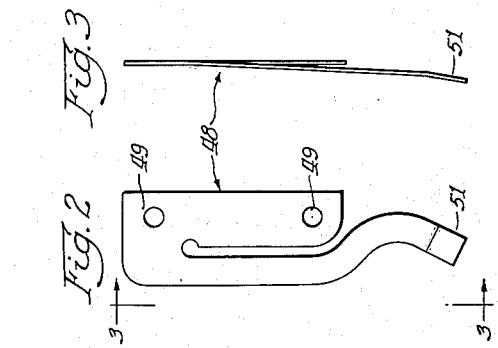
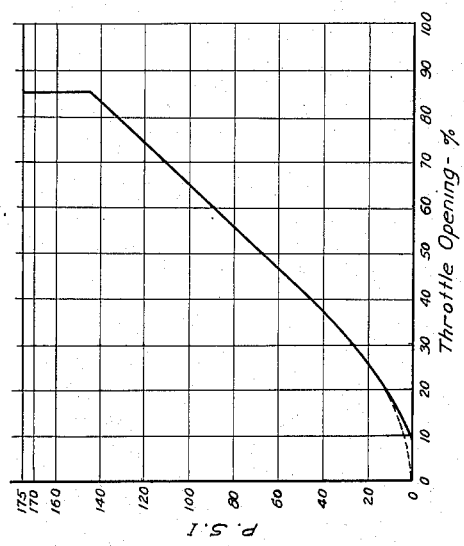
Inventor:
Charles H. Baker, Jr.
By:

United States Patent Office 2,733,732
Patented Feb. 7, 1956

2,733,732

VALVE CONTROL MECHANISM

Charles H. Baker, Jr., Muncie, Ind., assignor to Borg-Warner Corporation, Chicago, Ill., a corporation of Illinois Application March 29, 1951, Serial No. 218,203

3 Claims. (Cl. 137—620)

The present invention relates generally to automatic transmissions for automotive vehicles and more particularly to fluid control systems for such transmissions.

The present invention is directed principally to manually operated valves which are designed to supply a fluid pressure that varies in accordance with the displacement of the valve from a retracted position. Valves of this type are of particular utility in automatic automotive vehicle transmission control systems wherein it is necessary to provide a variable fluid pressure that increases as the vehicle accelerator pedal is depressed. Such an accelerator pedal controlled valve is shown in the copending application of R. W. Wayman, Serial No. 166,136, filed June 15, 1950, and the present invention comprises an improved means for controlling this valve.

It has been found that the accelerator pedal controlled valve, which is referred to as the throttle valve in the above referred to Wayman application, since it is returned to a retracted position by the variable pressure which it itself provides, sometimes sticks slightly just before it reaches its retracted position and fails to completely reach such position. This sticking of the valve may be due basically to any one of a number of things, such as, high oil viscosity particularly in cold weather, minor irregularities on the surfaces of the valve and the valve bore, etc. Due to these factors the valve sometimes does not slide freely and when this happens, the low variable pressure which returns the valve to its retracted position is not sufficient to invariably retract the valve. When this occurs a very low residual pressure, of the order of one to three pounds per square inch, is maintained and this interferes with the proper operation of the other parts of the control system. In particular, such residual pressure has been found to hinder the proper operation of the low regulator valve, the 3-2 control valve and the throttle valve modulator, all of which are shown in the aforementioned Wayman patent, and because of this interference several of the automatic shifts are rough. Particularly the downshift from third to second forward speed drive, when the throttle is substantially closed or opened very slightly, is quite rough. This roughening of the shift is brought about because of the improper timing of the engagement and disengagement of the different controlling clutches and brakes.

The principal object of the present invention is therefore to provide a manually controlled valve which supplies a fluid pressure that varies in accordance with the displacement of the valve and which decreases to zero when the manual controlling means are released.

A more specific object of the invention is to provide a valve that is differentially positioned by the depressive force on the vehicle accelerator pedal and the force of a variable fluid pressure which is regulated in accordance with the position of the valve, and which is invariably returned to a retracted position upon the release of the accelerator pedal.

A further object of the invention is to provide a spring in combination with a differentially positionable valve which is effective to insure the return of the valve to a retracted position whenever a manual means for primarily controlling the position of the valve is released.

The above and numerous other objects and numerous advantages of the present invention will become apparent from the following detailed description, when read in conjunction with the accompanying drawings, wherein:

Fig. 1 is a schematic view showing the principal features of the invention;

Figs. 2 and 3 are detail views of the spring for returning the valve to its retracted position; and Fig. 4 is a graph showing throttle pressure for different openings of the vehicle throttle.

As already stated the present invention is particularly applicable to the above referred to Wayman transmission control system and for a thorough understanding of such control system reference should be had to said case. Only those features of the Wayman control system have been shown herein which are deemed necessary for a thorough understanding of the present invention.

With reference now to the drawings, wherein like reference numerals in the different views identify identical parts throughout, a valve casing 10 is bored, as at 11, for receiving a throttle valve 12 and a downshift valve 13. An accelerator pedal 14 is shown schematically as being connected with the downshift valve 13 by means of a rod 15 and it will be understood that this connection between the accelerator pedal 14 and the downshift valve 13 may either be a lost motion connection, as shown, or the accelerator 14 and the downshift valve 13 may be positively connected together. An oil sump 16 is provided for maintaining a supply of oil and an oil pump 17 is provided for pumping the oil from the sump 16 and supplying it under pressure.

The downshift valve 13 is provided with a pair of lands 18 and 19 which are separated by means of a peripheral groove 20. The throttle valve 12 is provided with lands 21, 22 and 23 and also has three grooves 24, 25 and 26. The downshift valve 13 is internally bored, as at 27, and has a compression spring 28 seated within this bore. The compression spring 28 also abuts the throttle valve 12 and thus there is a resilient connection between the downshift valve 13 and the throttle valve 12. The end of the throttle valve 12 may be counterbored if desired (not shown) in order to form a seat for the end of the spring 28.

The casing 10 is provided with a plurality of peripheral grooves surrounding the bore 11. These peripheral grooves are identified respectively by reference numerals 29—36. The grooves 29 and 30 are respectively connected with conduits 37 and 38, which correspond respectively with conduits 345 and 344 in the above-mentioned Wayman application.

When the pump 17 operates, fluid is pumped from the sump 16 through a conduit 39 through the pump 17 and is pumped out under pressure through a conduit 40. The conduit 40 is connected with the grooves 31 and 35, and a pressure relief valve 41 insures that the pressure in the conduit 40 will not be too high. The branch conduit 42 connecting the conduit 40 with the groove 31, corresponds to the conduit 359 in the above-mentioned Wayman case. The grooves 32 and 33 are respectively connected with a pair of bleed conduits 43 and 44. The grooves 34 and 36 are respectively connected to a conduit 45 by means of conduits 46 and 47. The conduit 45 corresponds to the conduit 332 in the above-referred to Wayman case.

A leaf spring 48 having a configuration, as shown in Figs. 2 and 3, has a pair of holes 49, and may be bolted to the casing 10 by means of a pair of bolts 50 which pass through these holes. When the leaf spring 48 is secured to the casing 10 by means of the bolts 50 its free end 51 engages the end of the valve 12 and biases it to the left, or towards its retracted position.

The leaf spring 48 is many times weaker than the compression spring 28 and upon depression of the accelerator pedal 14, which tends to compress the compression spring 28, the throttle valve 12 is moved to the right in substantially the same manner as it would be moved were there no leaf spring 48 engaging the valve 12.

When the accelerator pedal 14 occupies its closed throttle position both valves 12 and 13 are removed slightly to the left. As will be apparent, movement of the valve 12 to its closed throttle position, causes the land 22 to bridge the groove 35 and therefore the fluid under pressure in the conduit 40 is blocked. Upon slight depression of the accelerator pedal 14 from its closed throttle position toward its open throttle position, the downshift valve 13 is moved to the right and the compression spring 28 causes the throttle valve 12 also to be moved to the right. This opens the groove 35 slightly, permitting fluid under pressure to enter the groove 24. It will be seen that the land 22 and the groove 35 act as a metering device so as to control the amount of fluid entering the groove 24 in accordance with the position of the valve 12. Due to the metering of the fluid by the land 22 and groove 35 the pressure of the fluid in the groove 24 is less than the pressure in the conduit 40. Further, the pressure of the fluid in the groove 24 is variable. The variable fluid pressure passes through the conduits 46, 45 and 47 into the groove 36 and from there into the groove 25 between the lands 22 and 23. Due to the fact that the land 22 has a larger diameter than the land 23, there is a differential action upon the valve 12 tending to move it to the left. It is therefore apparent that the variable fluid pressure in the groove 25 opposes the action of the compression spring 28 and consequently the valve 12 is differentially positioned, the compression spring 28 tending to urge it to the right, away from its retracted position which it assumes when the accelerator pedal 14 occupies its closed throttle position, and the variable fluid pressure in the groove 25 tending to move the valve 12 to the left, toward its retracted position. As is apparent, the further the accelerator pedal 14 is depressed, the greater the compression of the spring 28 and consequently the greater the tendency for the valve 12 to be moved to the right. However when the valve 12 moves to the right the opening between the land 22 and the groove 35 increases and the variable pressure in the groove 25 also increases and the force tending to move the valve 12 to the left is likewise greater. Upon a release of the accelerator pedal 14 the force exerted upon the valve 12 by the compression spring 28 is decreased to substantially zero and the variable fluid pressure in the groove 25 urges the valve 12 to the left.

When the accelerator pedal 14 is moved from open position to its closed position the variable fluid pressure in the groove 25, as it moves the valve 12 to the left, suddenly decreases and accordingly the force tending to move the valve 12 to the left also decreases. So long as there is any opening between the land 22 and the groove 35 there will be some pressure in the groove 25 and consequently the variable fluid pressure in the groove 25 is usually sufficient to return the valve 12 to the left until the land 22 blocks the groove 35.

It has been found, however, that many minor things, such as have been referred to above, sometimes tend to prevent the slight fluid pressure in the groove 25 from moving the valve 12 to the left sufficiently to cause a closure of the groove 35 and when this occurs the transmission control system with which the present invention is to be used does not function properly. In order to remedy this undesirable condition the very weak leaf spring 48 is continually pressing against the valve 12, tending to move it towards its retracted position. The effect of the leaf spring 48, upon depression of the accelerator 14, is negligible but the spring 48 exerts a sufficient force upon the valve 12 to insure movement thereof to its retracted position when the accelerator 14 is moved to its closed throttle position.

The present invention therefor provides a throttle valve which is positively returned to a retracted position upon release of the vehicle accelerator pedal to its closed throttle position and when such a throttle valve is utilized in a transmission control system of the type disclosed in the above-referred to Wayman case, the performance of the system is greatly improved, there then being no residual throttle pressure to cause malfunction of the transmission when the accelerator pedal is closed. A brief reference to Fig. 4 of the drawings in the present case will illustrate the effect of the leaf spring 48. It is desired that the throttle pressure follow the curve represented by the solid line in Fig. 4, that is, that the throttle pressure in the conduit 45 drop to zero pounds per square inch at approximately a 10 per cent throttle opening. When the throttle valve 12 does not return to its retracted position upon release of the accelerator pedal to its closed throttle position, the throttle pressure in the conduit 45 instead of following the solid line curve follows a curve such as the one represented by the dotted line in Fig. 4. Thus even though the accelerator 14 is in its closed throttle position there will still be a residual pressure of from one to three pounds per square inch or sometimes higher, in the conduit 45. By the present invention such a residual pressure has been completely eliminated.

Although the present invention has been described in connection with a particular transmission control system, it is to be understood that such system has been referred to only for purposes of illustration, and whenever it is desired to have a valve function in a manner in which the valve 12 in the present application functions it is apparent that the present invention will be particularly useful. It is contemplated that numerous changes and modifications may be made in the invention without departing from the spirit or scope thereof.

I claim:

1. In combination with a valve for use in a control system of an automotive vehicle transmission wherein the valve is primarily controlled by the accelerator of the vehicle, a casing having the valve movably disposed therein, resilient means interposed between the valve and the accelerator and effective upon movement of the accelerator toward an open throttle position to move the valve towards a corresponding position, a source of fluid under pressure for supplying pressure fluid to said valve, said valve including a metering means normally blocking the fluid when the accelerator is in a closed throttle position and effective to supply a fluid pressure proportional to the degree of opening of the throttle, means for applying said last-mentioned fluid pressure to a portion of the valve in opposition to said resilient means whereby the valve is differentially positioned by said resilient means and said last-mentioned fluid pressure, and means acting in concert with said last-mentioned fluid pressure for at all times insuring the differential positioning of said valve, said last named means including a spring having a portion resiliently engaging said valve for urging the valve toward said retracted position and with the spring being secured to said casing externally thereof in position for installation and replacement when the device is completely assembled and otherwise in operative condition.

2. In a differentially operable fluid pressure regulating device for use in a control system of an automotive vehicle transmission having in combination a valve primarily controlled by the accelerator of the vehicle, a casing having the valve movably disposed therein, a source of fluid pressure for supplying pressure fluid to said valve, a land on said valve for blocking said fluid pressure when the valve is in a retracted position, means interposed between the valve and accelerator for resiliently displacing said valve from its said retracted position upon movement of the accelerator toward open throttle position, one side of said land being effective to meter the fluid upon the displacement of the valve from said retracted position and supply a fluid pressure proportional to the amount of displacement of said valve, means for applying the metered fluid to the other side of said land to cause the last-mentioned fluid pressure to urge the valve toward its said retracted position to thereby differentially position the valve substantially in accordance with the forces applied by said first-mentioned means and said last-mentioned fluid pressure, and a leaf spring externally secured to said casing and having a free end portion resiliently engaging the valve for biasing the valve toward the said retracted position for thereby insuring the return of the valve to its said retracted position upon the release of said first-mentioned means.

3. In a differentially operable fluid pressure regulating device, for use in a control system for an automotive vehicle transmission the combination of a valve primarily controlled by the accelerator of the vehicle, a casing having the valve movably disposed therein, a source of fluid pressure for supplying pressure fluid to said valve, a land on said valve for blocking said fluid pressure when the valve is in a retracted position, means interposed between the valve and the accelerator for resiliently displacing said valve from its said retracted position upon movement of the accelerator toward open throttle position, one side of said land being effective to meter the fluid on the displacement of the valve from said retracted position and supply a fluid pressure proportional to the amount of displacement of said valve, a second land on said valve, means for applying the metered fluid between the other side of said first-mentioned land and the second land to cause the last-mentioned fluid pressure to urge the valve towards its said retracted position to thereby differentially position the valve substantially in accordance with the forces applied by said first-mentioned means and said last-mentioned fluid pressure, and a leaf spring secured to said casing externally thereof and resiliently engaging the valve for biasing the valve toward its said retracted position for thereby insuring the return of the valve to its said retracted position upon the release of said first-mentioned means.

References Cited in the file of this patent

UNITED STATES PATENTS

| | | |
|---|---|---|
| 253,139 | Wenger | Jan. 31, 1882 |
| 1,839,837 | Deming | Jan. 5, 1932 |
| 1,925,109 | Olson | Sept. 5, 1933 |
| 1,932,760 | West | Oct. 31, 1933 |
| 2,159,610 | West | May 23, 1939 |
| 2,265,480 | Harrington et al. | Dec. 9, 1941 |
| 2,347,321 | Huber | Apr. 25, 1944 |
| 2,358,644 | Kelly | Sept. 19, 1944 |